United States Patent
Jansen et al.

(10) Patent No.: US 8,679,370 B2
(45) Date of Patent: *Mar. 25, 2014

(54) CONDUCTIVE COATING, METHOD FOR PREPARING A COATING, ROLLER, AND METHOD FOR MANUFACTURING A ROLLER AND USING A COATING

(71) Applicant: Ten Cate Enbi International B.V., Beek (NL)

(72) Inventors: John Jansen, Beek (NL); Tsuyoshi Tokiwa, Beek (NL); Eiji Sawa, Beek (NL)

(73) Assignee: Ten Cate Enbi International B.V., Beek (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/802,435

(22) Filed: Mar. 13, 2013

(65) Prior Publication Data

US 2013/0195517 A1 Aug. 1, 2013

Related U.S. Application Data

(63) Continuation of application No. 12/424,413, filed on Apr. 15, 2009, now Pat. No. 8,419,977.

(30) Foreign Application Priority Data

Apr. 15, 2008 (EP) ..................................... 08075296
Nov. 25, 2008 (EP) ..................................... 08020427

(51) Int. Cl.
 *H01B 1/00* (2006.01)

(52) U.S. Cl.
 USPC ........... 252/500; 399/265; 399/280; 399/286; 399/346; 428/195.1; 430/114; 525/131

(58) Field of Classification Search
 USPC .................. 252/500; 399/286, 265, 280, 346; 525/131; 428/195.1; 430/114
 See application file for complete search history.

(56) References Cited

U.S. PATENT DOCUMENTS

| 6,476,134 | B1* | 11/2002 | Bolz et al. ..................... 525/131 |
| 7,962,077 | B2 | 6/2011 | Jansen et al. |
| 8,419,977 | B2* | 4/2013 | Jansen et al. .................. 252/500 |
| 2007/0212527 | A1* | 9/2007 | Dontula et al. ............ 428/195.1 |

OTHER PUBLICATIONS

European Search Report and Written Opinion issued for European Application No. 08020427.4 filed on Nov. 25, 2008. date completed: Mar. 27, 2009.
Communication pursuant to Article 94(3) EPC mailed on Apr. 20, 2010 issued for European Application No. 08020427.4 filed on Nov. 25, 2008.
Reply to Communication pursuant to Article 94(3) EPC mailed on Apr. 20, 2010 issued for European Application No. 08020427.4 filed on Nov. 25, 2008 dated Aug. 23, 2010.

(Continued)

*Primary Examiner* — Khanh Tuan Nguyen
(74) *Attorney, Agent, or Firm* — Steinfl & Bruno LLP

(57) ABSTRACT

A conductive coating is described, suitable for coating a developer, charge or transfer roller in a developing apparatus to give a charge providing layer. The coating comprises a conductive polymer in a matrix. A roller is also described, suitable for a developing apparatus comprising, from the center to the periphery, a conductive mandrel, a conductive elastic base layer and a charge providing layer.

18 Claims, 3 Drawing Sheets

(56) References Cited

OTHER PUBLICATIONS

Communication pursuant to Article 94(3) EPC mailed on Aug. 30, 2010 issued for European Application No. 08020427.4 filed on Nov. 25, 2008.
Reply to Communication pursuant to Article 94(3) EPC mailed on Aug. 30, 2010 issued for European Application No. 08020427.4 filed on Nov. 25, 2008 dated Mar. 8, 2011.
Communication pursuant to Article 94(3) EPC mailed on Jun. 24, 2011 issued for European Application No. 08020427.4 filed on Nov. 25, 2008.
Reply to Communication pursuant to Article 94(3) EPC mailed on Jun. 24, 2011 issued for European Application No. 08020427.4 filed on Nov. 25, 2008 dated Nov. 2, 2011.
Communication pursuant to Article 94(3) EPC mailed on Aug. 27, 2012 issued for European Application No. 08020427.4 filed on Nov. 25, 2008.
Reply to Communication pursuant to Article 94(3) EPC mailed on Aug. 27, 2012 issued for European Application No. 08020427.4 filed on Nov. 25, 2008 dated Dec. 18, 2012.
Communication pursuant to Article 94(3) EPC mailed on Mar. 30, 2010 issued for European Application No. 08075296.7 filed on Apr. 15, 2008.
Reply to Communication pursuant to Article 94(3) EPC mailed on Mar. 30, 2010 issued for European Application No. 08020427.4 filed on Nov. 25, 2008 dated Jul. 8, 2010.

* cited by examiner

CONDUCTIVE COATING, METHOD FOR PREPARING A COATING, ROLLER, AND METHOD FOR MANUFACTURING A ROLLER AND USING A COATING

CROSS REFERENCE TO RELATED APPLICATIONS

This application is a continuation of U.S. application Ser. No. 12/424,413 filed on Apr. 15, 2009, which in turn claims priority to European Patent Application EP 08075296.7 filed on Apr. 15, 2008 and European Patent Application EP 08020427.4 filed on Nov. 25, 2008, the contents of both of which are incorporated herein by reference in their entirety. This application is also related to U.S. application Ser. No. 12/422,888 filed on Apr. 13, 2009, the contents of which are also incorporated by reference in their entirety.

FIELD

The present disclosure relates to a conductive coating suitable for coating a developer, charge or transfer roller in a developing apparatus to give a charge providing layer, said coating comprising a conductive polymer in a matrix.

The present disclosure further relates to a method for preparing a coating.

The present disclosure also relates to a roller suitable for a developing apparatus comprising from the centre to the periphery a conductive mandrel, a conductive elastic base layer and a charge providing layer.

The present disclosure further relates to a method for manufacturing a roller.

The present disclosure also relates to the use of a coating.

BACKGROUND

Developing rollers, known from U.S. Pat. No. B2-6,714,754, are used in an image forming apparatus for developing an electrostatic latent image on a surface of an image bearing member by use of a non magnetic toner to form a toner image. To obtain good images, the requirements of the developing roller are relatively high, especially with respect to the conductivity, hardness, uniformness of the surface etcetera. Furthermore it is important that the charge providing layer has a good connection to the base layer to prevent local separation or peeling off of the charge providing layer due to the friction between the charge providing layer and the particles of the non magnetic toner. A charge providing layer according to this patent contains conductive particles dispersed therein to have conductivity.

In the developing roller according to the above mentioned patent, an elastic intermediate layer is provided between the charge providing layer and the base layer in order to increase the adhesion between the base layer and the charge providing layer.

This prior art method has the disadvantage that an additional layer, e.g., the intermediate layer, is required on the developing roller. Such an intermediate layer often comprises a solvent having a good adherence to the base layer. Such solvent is not good for the environment. Furthermore, the electrical conductivity of such an elastic layer is relatively poor, which is detrimental for the functioning of the roller.

In EP 1 079 280 a charge providing layer is described, which layer is obtained by a coating containing filler particles; the size and amount of the filler particles determining the surface roughness of the resulting charge providing layer. A disadvantage of the use of such filler particles is firstly, that adhesion problems may occur with the baser layer and secondly that uneven distribution of the filler particle may lead to an uneven surface roughness, which is undesirable.

SUMMARY

According to an aspect of the present disclosure, a conductive coating is provided, suitable for coating a developer, charge or transfer roller in a developing apparatus to form a charge providing layer, said coating comprising a conductive polymer in a matrix, said matrix comprising a methacrylic acid-acrylic ester copolymer and a polyurethane dispersion, wherein the methacrylic acid-acrylic ester copolymer and the polyurethane dispersion show micro phase separation.

According to a further aspect of the present disclosure, a roller is provided, suitable for a developing apparatus comprising, from centre to periphery, a conductive mandrel, a conductive elastic base layer and a charge providing layer, wherein the roller has a surface roughness of at least 1.3 µm measured according to ISO 4287:1997 and a resistance of at least $3.8*10^5$ ohm.

Further aspects of the present disclosure can be found in the specification, drawings and claims of the present application.

In the present disclosure, a conductive coating is provided, suitable for coating a developer, charge or transfer roller in a developing apparatus wherein said coating comprises a conductive polymer in a matrix and wherein said coating, when dried, shows good surface roughness.

In the present disclosure, a conductive coating is also provided, suitable for coating a developer, charge or transfer roller in a developing apparatus which coating after drying to form the charge providing layer has good developing qualities.

In the present disclosure, a roller is further provided, suitable for a developing apparatus providing a charge providing layer with good surface roughness.

Use of a coating according to the present disclosure is also provided on a roller for a development apparatus for micro phase separation of said coating, to provide the roller with a charge providing layer with good surface roughness.

A conductive coating is also provided, suitable for coating a developer, charge or transfer roller in a developing apparatus, said coating comprising a conductive polymer in a matrix, said coating having good adherence to the base layer without the need for an additional, intermediate layer.

There is a continuing increase in the demand for higher print quality and faster printing speed and therefore rollers in developer apparatuses are required to have better quality.

A roller for a developing apparatus generally consists, from the centre to the periphery, of a conductive mandrel, a conductive elastic base layer (hereafter base layer) and a charge providing layer.

During the manufacturing of rollers according to the prior art, the surface of the base layer is roughened before application of the charge providing layer in order to facilitate a good connection between the base layer and the charge providing layer. In some prior art methods this roughening is made redundant by the use of an elastic intermediate layer.

A charge providing layer is applied to the base layer to obtain the desired surface roughness as well as chargeability.

Roughening of the surface of the base layer also contributes to the quality of printing. A drawback of the prior art roughening methods is that it is difficult to roughen the surface of the base layer without causing roughness orientation. Roughness orientation means that the applied structures causing the roughness are not evenly divided over the roller. This will lead to an uneven distribution of toner on the developer roller which will result in poorer print quality. This on its turn results in an uneven distribution of toner on the paper to be printed on. The result is visible in a printed image as an uneven distribution of toner which can be visible as stripes in a printed image.

The present disclosure is, in particular, suited for charge rollers, developer rollers and transfer rollers as used in developing apparatuses, such as, for example, laser printers and print presses.

According to some embodiments of the present disclosure, the matrix of the conductive coating comprises a methacrylic acid-acrylic ester copolymer and a polyurethane dispersion wherein the methacrylic acid-acrylic ester copolymer and the polyurethane dispersion show micro phase separation.

This micro phase separation which occurs upon drying of the coating and hence upon formation of a charge providing layer, provides a charge providing layer with little or no roughness orientation on the surface structure of the roller. This means that the surface roughness in both radial and axial direction of the roller is similar. The micro phase separation giving rise to surface roughness and therefore no filler particles are required. Furthermore, the conductive coating also improves the changeability of the roller when dried to form the charge providing layer. Such uniform surface chargeability is advantageous for obtaining a uniform charge providing layer and has a good toner transfer property and print quality.

BRIEF DESCRIPTION OF THE DRAWINGS

The present disclosure is described in more detail with respect to the drawings, in which.

DETAILED DESCRIPTION

In the present description and claims, the term "micro phase separation" means that the ingredients in the coating material are separated on a micro scale.

In the present description and claims, the term "chargeability" means the capability to cause electric charge when the bias voltage is applied between the surface of the roller and the conductive mandrel.

In the present description and claims, the term "charge providing layer" means that this layer will cause the electric charge and provide the electric charge to a photoconductor.

In the present description and claims, the term "coating" means that a charge providing layer has been applied on the surface of a base layer as a thin film.

In the present description and claims, the term "roller" means bias developer roller, transfer roller and/or charge roller in an electric photo printing system.

In the present description and claims, the term "charge roller" means a roller providing a so called photo conductor drum in, for example, a laser printer or copier with charges, so that an image can be formed on the photo conductor drum by means of, e.g., a laser. Charge rollers are also called primary charge rollers (PCR) and provide high quality and stable printing in for example laser printers and copiers.

In the present description and claims, the term "developer roller" means a roller carrying a uniform layer of charged toner particles which form a latent image on the photo conductor drum which is charged by the charge roller. Developer rollers are important for prints of good quality. In order to achieve this, developer rollers possess uniform and stable electrical properties and uniform surface roughness.

In the present description and claims, the term "transfer roller" means a roller transferring the image formed on the photo conductor drum by means of a developer roller to the paper to be printed or together with a heating roller.

In the present description and claims, the term "methacrylic acid-acrylic ester copolymer" means an acrylic polymer based on: methacrylic acid and ethylacrylate.

In the present description and claims, the term "polyurethane dispersion" means a dispersion of an aliphatic polyesterpolyurethane.

The use of a combination of a methacrylic acid-acrylic ester copolymer and a polyurethane dispersion allows the formation of a micro phase separated charge providing layer on a roller.

Figure 1:
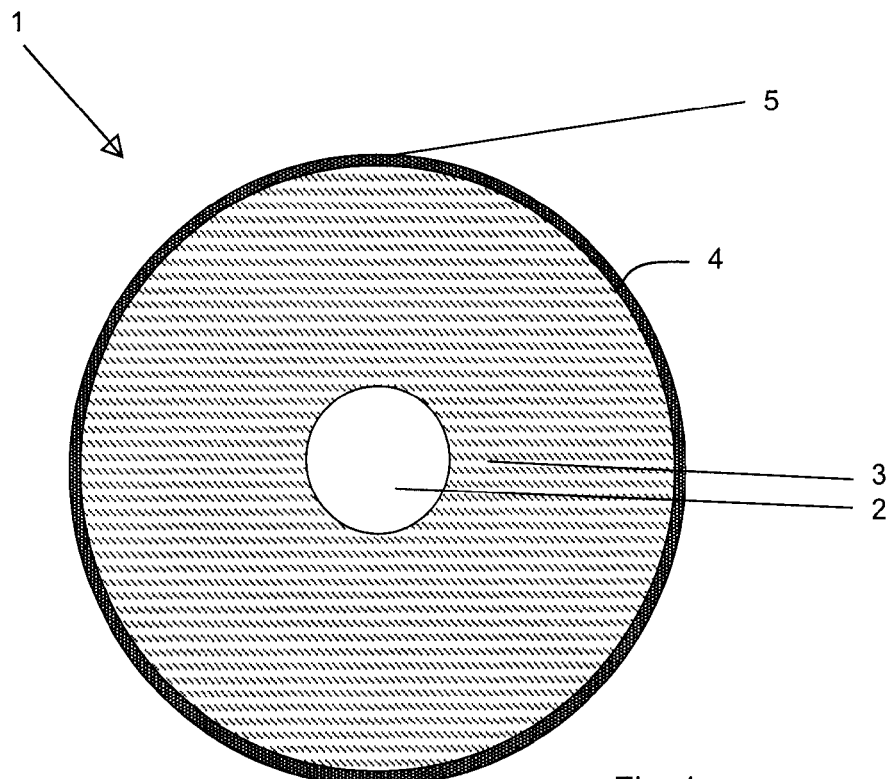
FIG. 1 is a schematic representation of a cross section of a first embodiment of a developing roller according to the present disclosure.
Figure 2:
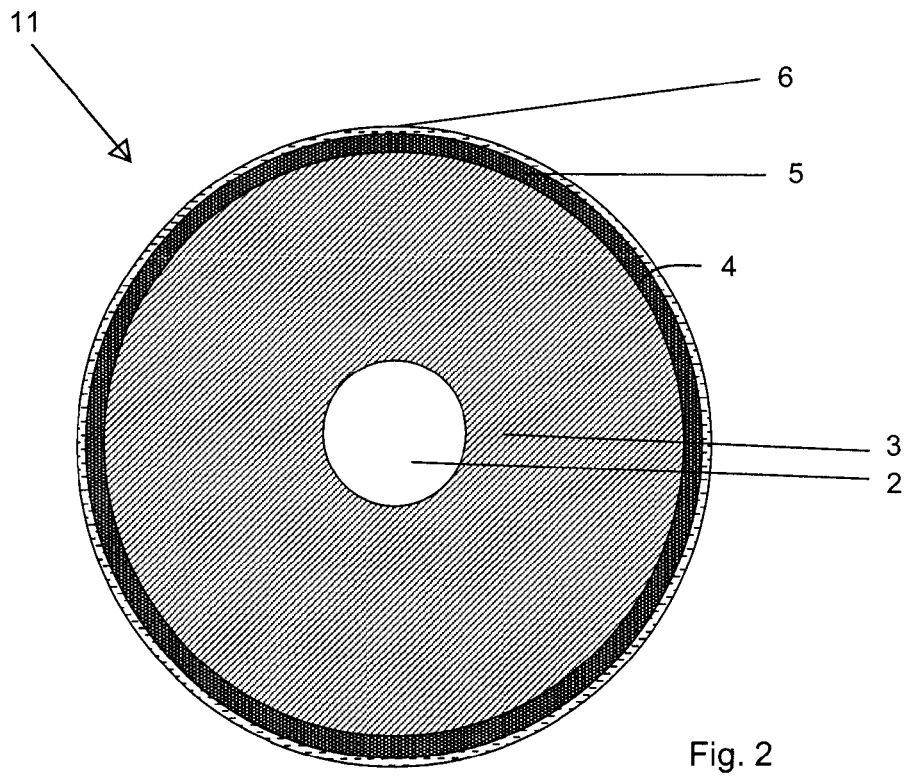
FIG. 2 is a schematic representation of a cross section of a second embodiment of a developing roller according to the present disclosure.

FIG. 1 shows a developing roller 1 according to the present disclosure which comprises a conductive mandrel 2 with a diameter in the range of, e.g., 6 mm to 20 mm. On mandrel 2, a base layer 3 of, for example, 4 mm is provided, made, for example, of silicone rubber containing conductive adhesives to control the electric resistivity. The silicone material can be Shinetsu KE1379AB. With this silicone material, the hardness of the base layer 1b is desirably less than 65 Asker C. The outer surface 4 of the base layer 3 is roughened or abraded by blasting. The blasting media material can be silica glass, ceramic, metal or plastic.

Figure 3:
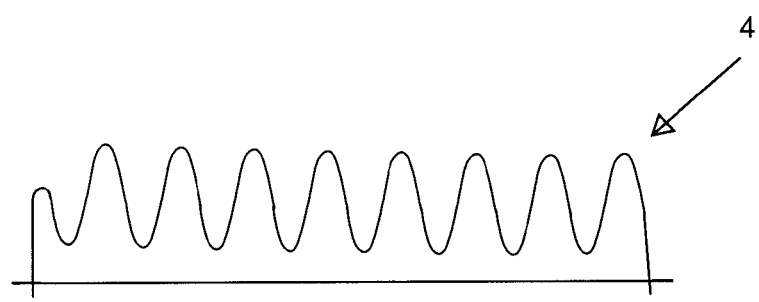
FIG. 3 shows on a large scale a blasted surface.
Figure 4:
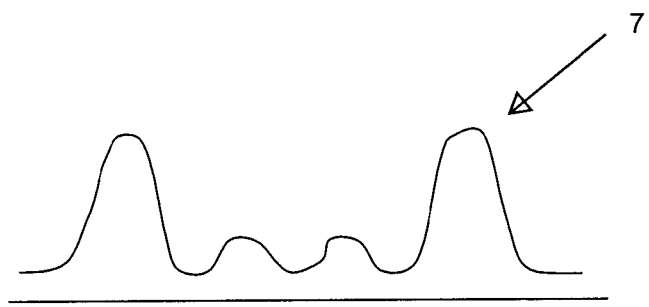
FIG. 4 shows a large scale a grinded surface.

In this embodiment, plastic media IEPCO MS400BT has been used. The size of the blasting media will be desirably less than 500 μm. When blasted, the blasting media is jetted out of the nozzle by air pressure in the blasting chamber. By this blasting method, the surface 4 is roughened, whereby the surface roughness SRa is controlled to be between 0.1 and 3.0. The surface roughness is determined, amongst others, by the air pressure of blasting, the distance between blasting nozzle head and the surface, the hardness of the rubber surface and the nozzle transfers speed. Due to the roughened surface, the surface energy is lowered down so that the charge providing layer 5 can easily be adhered thereon. Through blasting, a relatively deep and finer surface structure can be obtained (see FIG. 3) than by grinding (see FIG. 5).

Figures 5A, 5B, 5C:
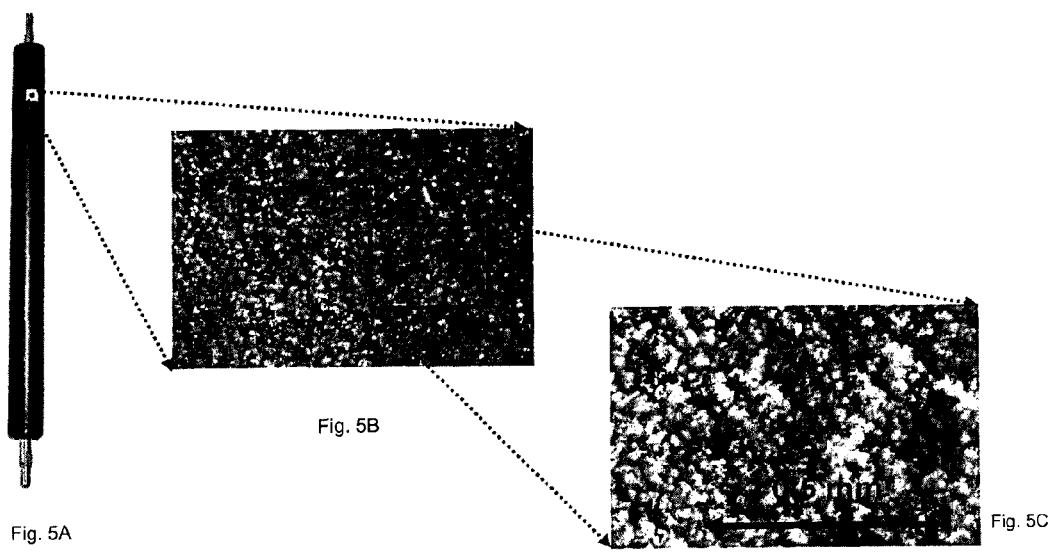
FIG. 5a shows a photograph of a roller according to the present disclosure.
FIG. 5b shows an enlargement of the charge providing layer of the roller according FIG. 5a as seen under a scanning electron microscope with a magnification of 25 times.
FIG. 5c is an enlargement of FIG. 5b under a scanning electron microscope with a magnification of 76 times showing micro phase separation.

FIG. 5a shows a picture of a roller according to the present disclosure in a side view. In FIG. 5b a microscopic picture of part of the surface of the charge providing layer, according to the present disclosure, with the micro phase separated coating is shown.

A further enlargement is depicted in FIG. 5c which clearly shows "islands" of one phase in another phase. It is very clear that the orientation of these "islands" is random and not oriented in either axial or radial direction. Furthermore, FIG. 6 shows a schematic view of the micro phase separation for ease of drawing a square pattern is depicted. However, as disclosed above the orientation is not patterned but random. The difference between the two separated phases is shown in light and dark section.

An embodiment of the present disclosure is characterized in that, the methacrylic acid-acrylic ester copolymer and the polyurethane dispersion are present in a ratio of 1:30 to 1:100, preferably 1:40 to 1:80, especially 1:50 to 1:60.

The applicants have found that these conductive coatings possess good micro phase separation abilities and hence give a good uniform surface roughness when applied to the base layer. Such uniform surface roughness is advantageous for obtaining a uniform charge providing layer and has a good toner transfer property and print quality.

An embodiment of the present disclosure is characterized in that, the methacrylic acid-acrylic ester copolymer is a thickening agent, preferably Rohagit SD15. In the presence of Rohagit SD15 the coating shows good micro phase separation. This gives a uniform surface roughness when applied to the base layer. Such a uniform surface roughness is advantageous for obtaining a uniform charge providing layer which has a good toner transfer property and print quality.

An embodiment of the present disclosure is characterized in that the coating further comprises additives, for example one or more of a base, a levelling agent, a wetting agent, a surfactant, an antioxidant, a viscosity reducing agent, a thickening agent and a stabilizer.

The present disclosure further relates to a method for preparing a coating comprising the step of mixing an aqueous solution of a conductive polymer, an aqueous dispersion of a methacrylic acid-acrylic ester copolymer and an aqueous polyurethane dispersion. With the method according to the present disclosure a conductive coating, suitable for coating a developer, charge or transfer roller in a developing apparatus said coating comprising a conductive polymer in a matrix, can be obtained.

In an embodiment of the method, the following ingredients are admixed to a conductive polymer dispersion: an appropriate amount of base, the polyurethane dispersion and the dispersion of a methacrylic acid-acrylic ester copolymer and optionally additives such as leveling agents, wetting agents, surfactants, antioxidants, viscosity reducing agents, thickening agents and stabilizers. A preferred method is disclosed in the examples.

The present disclosure further relates to a roller suitable for a developing apparatus comprising from the center to the periphery a conductive mandrel, a conductive elastic base layer and a charge providing layer and is characterized in that the charge providing layer is obtained by drying the coating according to the present disclosure. During the drying of the coating, micro phase separation takes place between the polyurethane dispersion and the methacrylic acid-acrylic ester copolymer, which micro phase separation facilitates the formation of an outer coating layer, when applied to a roller, without roughness orientation in axial or radial direction on the surface structure of the roller. This gives the roller a uniform surface which is advantageous for obtaining a uniform charge providing layer and has a good toner transfer property and print quality. Such roller possesses good toner transfer property and print quality.

An embodiment of the present disclosure is characterized in that the base layer is made up out of a rubber chosen from the group consisting of silicone rubber, ethylene-propylene-diene copolymer rubber, urethane rubber, nitrile-butadiene rubber. Such rubbers have good properties such as high durability which advantageous for a roller used in a developing apparatus.

An embodiment of the present disclosure is characterized in that the ratio between the surface roughness of the charge providing layer in the axial direction ($S_{raax}$) as measured according to ISO 4287:1997 (with a Mitutoyo SJ400 surface roughness meter) and the surface roughness of the charge providing layer in the radial direction ($SRa_{rad}$) as measured according to ISO 4287:1997 (with a Mitutoyo SJ400 surface roughness meter) of the roller is $0.5<(SRa_{ax})/(SRa_{rad})<2$ and preferably $0.75<(SRa_{ax})/(SRa_{rad})<1.25$ and more preferably $0.9<(SRa_{ax})/(SRa_{rad})<1.1$. Rollers with such ratio possess good uniformity over the total surface of the roller. This results in a good printing quality.

The present disclosure furthermore relates to a method for manufacturing a roller according to the present disclosure and is characterized in that the coating is applied on the base layer and then dried to form the charge providing layer.

In a preferred embodiment, the base layer is roughened before applying the coating. This achieves optimal adherence of the charge providing layer to the base layer.

Preferably, the surface of the base layer is roughened by blasting. Although the surface of the base layer can also be roughened by grinding, blasting is preferred because it can create deeper and finer surface structure than grinding. Furthermore by blasting a more uniform roughness over the whole surface is obtained than by grinding. A uniform surface is advantageous for obtaining a uniform charge providing layer and has a good toner transfer property and print quality.

In case the base layer consists of a NBR rubber or EPDM rubber, the surface is preferably ground before the coating is applied on the surface. In order to grind the surface of base layer, normally a ceramic stone or diamond applied metal wheel is used to grind the surface of NBR, EPDM rubber. The roughness of ground surface of a developer, charge or bias transfer roller is preferably $0.1<Bra<3$ μm.

An embodiment of the present disclosure is characterized in that the coating is applied to a base layer with a surface roughness (BRa) of $0.1<Bra<3$. With such surface roughness, a good connection between the base layer and the charge providing layer is obtained and also a good printing quality can be realized.

An embodiment of the present disclosure is characterized in that the coating is dried at a temperature below 60° C., preferably at or below 40° C., to control the surface roughness of the resulting charge providing layer. The applicants found that micro phase separation takes place while the coating has not dried yet. Hence, the amount of micro phase separation depends on the time the coating is wet during the method. This time can be influenced by the drying temperature. For example, this time is shortened by applying a higher temperature or lengthened by applying a lower temperature. The applicants found that a drying temperature at or above 60° C. does not allow enough time for sufficient micro phase separation resulting in a roller with too little surface roughness.

Preferably, the drying temperature lies below 60° C. because this results in a roller with good surface roughness. More preferably, the drying temperature lies below 40° C. allowing for enough time to give good micro phase separation resulting in a roller with good surface roughness. The drying temperature can be adjusted according to the required surface roughness which can vary with different types of rollers and also depends on the specific coating used. A skilled person can determine the optimal temperature in each specific condition.

An embodiment of the present disclosure is characterized in that the coating is applied by dipping, spraying or rolling. This results in a good distribution of the coating on the roller. A good distribution of the coating contributes to a good uniformity of the surface roughness over the total surface of the roller resulting in a good printing quality.

The present disclosure further relates to the use of a coating for obtaining a micro phase separated charge providing layer on a roller in a developing apparatus. The use of the coating for micro phase separation results in a roller with a roughened surface with very little roughening orientation. A roller with a micro phase separated charge providing layer further has good chargeability characteristics. Therefore, the use of the coating as a charge providing layer on a roller for a developing apparatus for micro phase separation of the coating results in a roller with good printing quality.

An embodiment of the present disclosure is that the roller is a charge roller, developer roller or transfer roller. Such rollers with a micro phase separated charge providing layer have good chargeability characteristics and have a roughened surface with very little roughening orientation. These rollers have good printing qualities.

The present disclosure further relates to a roller suitable for a developing apparatus comprising from the centre to the periphery a conductive mandrel, a conductive elastic base layer and a charge providing layer which is characterized in that, the roller has a surface roughness of at least 1.3 µm measured according to ISO 4287:1997 (with a Mitutoyo SJ400 surface roughness meter) and a resistance of at least $3.8*10^5$ ohm measured according to ISO 4287:1997 (with a Mitutoyo SJ400 surface roughness meter). A roller with such a surface roughness and such a resistance has good charging-discharging properties. A roller with such properties possesses good toner transfer properties and print quality.

An embodiment of the roller according to the present disclosure is characterized in that before the charge providing layer is applied to the base layer, the base layer has a surface roughness BRa of 0.1<BRa<10. With such a surface roughness a good connection between the base layer and the charge providing layer is obtained and also a good printing quality can be realized. A good compromise is found at 0.2<BRa<4 and more preferably at 0.5<BRa<3.

A further embodiment of the roller according to the present disclosure is characterized in that the ratio between the surface roughness of the base layer in axial direction and radial direction of the developing roller is 0.5<BRa (axial direction)/BRa (radial direction)<2. With such ratio, a good uniformity over the total surface of the roller is obtained resulting in a good printing quality.

The present disclosure is further explained by the following, non-limiting examples.

EXAMPLES

Three different coatings are used in the following examples.

Table 1 shows the constituents for the coatings 1 and 2. Coating 1 is a coating according to the present disclosure, having a certain ratio of the methacrylic acid-acrylic ester copolymer (Rohagit SD15) and the polyurethane dispersion (ABU710). Coating 2 is a comparative coating in which the methacrylic acid-acrylic ester copolymer is absent.

The coatings according to Table 1 were prepared by admixing to a dispersion of Baytron P of the following: ammonia, ABU710, Rohagit SD15, BYK-333 and BYK-348, preferably in this order and preferably at room temperature.

TABLE 1

| Type of constituent | Compound (amount [wt %]) | Coating number 1 | 2 |
|---|---|---|---|
| Conductive polymer | Baytron P | 31.5 | 31.5 |
| Base | Ammonia 5% | 2 | 15 |
| Polyurethane dispersion | ABU710 | 64.8 | 66.3 |
| Methacrylic acid-acrylic ester copolymer | Rohagit SD15 | 1.2 | 0 |
| Leveling agent | BYK-333 | 1 | 1 |
| Leveling agent | BYK-348 | 4 | 5 |

Baytron P: H.C. Starck GmbH, ZB-PT Stab PSI, Postfach 2540, 38615 Goslar Germany
ABU710: Alberdingk, Deusseldorfer Str. 53, 47829 Krefeld, Germany
Rohagit SD15: PolymerLatex GmbH, D-45764, Marl, Germany
BYK-333, BYK-348, BYK-Chemie GmbH, Abelstr. 14, D-46483 Wesel, Germany Table 2 shows information of examples 1-10, wherein examples 1 and 2 are according to the present disclosure and examples 3-5 are comparative examples. The base layer 3, in the examples, is roughened prior to application of the coating by traverse grinding. The correlation between the surface roughness ratio and the print quality is shown in Table 2.

The surface roughness, resistance and hardness of the uncoated rollers were determined. These values are listed in Table 2. In Table 2 $Ra_{ax}$ stands for roughness in the axial direction and $Ra_{rad}$ stands for roughness in the radial direction. BRa stands for roughness of the base layer before coating and SRa stands for roughness of the charge providing layer after coating. Roughness is measured according to ISO 4287:1997 (with a Mitutoyo SJ400 surface roughness meter).

After the coatings were applied to the roughened rollers, they were left to dry at different temperatures. Rollers 1, 2 and 3 were left to dry at temperatures of 22° C., 40° C., and 60° C. respectively. Rollers 4 and 5 were left to dry at 22° C. and 60° C. respectively as can be seen in Table 2. Table 3 also indicates on which rollers micro phase separation occurred.

After drying the surface roughness, resistance and hardness of the coated rollers were determined again. Also the ratio between the roughness in the axial direction ($SRa_{ax}$) and the roughness in the radial direction ($SRa_{rad}$) was determined to obtain a measure for the uniformity of the surface roughness. The ratio was obtained by dividing $SRa_{ax}$ over $SRa_{rad}$. The results are also listed in Table 2.

Table 2 clearly shows that the print quality is good for the rollers 1 and 2 coated with a coating according to the present disclosure and treated according to the method according to the present disclosure and bad for the comparative examples 3, 4 and 5. A good Black Density has a value higher than 1 as measured with a Macbeth densitometer D19. The density, halftone uniformity and full color uniformity were evaluated by visual inspection. The good print quality of the examples according to the present disclosure is due to the uniform surface roughness which gives good printing properties to the rollers. The bad uniformity in the prints of comparative examples is caused by the roughness orientation caused by the used roughening method.

As shown in Table 2, examples 1 and 2 are coatings according to the present disclosure and can be applied to roughened rollers and dried at different temperatures. These rollers possess good printing quality. It is noted that the print quality is bad for comparative example 3. This is caused by the shortened drying time due to the high drying temperature. This shortened time does not allow for sufficient micro phase separation in the coating of the present disclosure to prevent surface roughness orientation and therefore gives rise to poor print quality. Drying temperatures of 40° C. or lower are sufficiently low to allow for enough time for micro phase separation, resulting in rollers with good print quality (examples 1 and 2).

It is further noted that coatings lacking Rohagit SD15 according to comparative examples 4 and 5 give, when applied to roughened rollers, rise to rollers with poor print quality. This is caused by the absence of micro phase separation in these coating composition. This results in rollers with roughness orientation.

TABLE 2

|  | Sample No. | | | | |
| --- | --- | --- | --- | --- | --- |
|  | 1 | 2 | 3*) | 4*) | 5*) |
| Black density | 1.30 | 1.00 | 0.80 | 0.60 | 0.50 |
| Evaluation of density | Good | Good | Bad | Bad | Bad |
| Half tone uniformity | Good | Good | Bad | Bad | Bad |
| Full color uniformity | Good | Good | Bad | Bad | Bad |

*) = example not according to the disclosure

TABLE 3

|  | Example | | | | |
| --- | --- | --- | --- | --- | --- |
|  | 1 | 2 | 3*) | 4*) | 5*) |
| Material of base layer | NBR | NBR | NBR | NBR | NBR |
| Abrasion method | Grinding | Grinding | Grinding | Grinding | Grinding |
| Axial base layer roughness ($BRa_{ax}$) [μm] | 1.20 | 1.15 | 1.17 | 1.18 | 1.15 |
| Radial base layer roughness ($BRa_{rad}$) [μm] | 1.49 | 1.52 | 1.51 | 1.50 | 1.47 |
| Ratio $BRa_{ax}/BRa_{rad}$ | 0.81 | 0.76 | 0.77 | 0.79 | 0.78 |
| Resistance at 500 V (ohm) | $1.48 \times 10^6$ | $1.34 \times 10^6$ | $1.38 \times 10^6$ | $1.37 \times 10^6$ | $1.45 \times 10^6$ |
| Hardness (shore A) | 58.5 | 57.8 | 58.0 | 57.9 | 58.2 |
| Coating type | 1 | 1 | 1 | 2 | 2 |
| (Top layer) | (no) | (no) | (no) | (no) | (no) |
| Micro phase separation | Yes | Yes | Yes | No | No |
| Drying temperature (° C.) | 22 | 40 | 60 | 22 | 60 |
| Axial surface roughness (SRax) [μm] | 2.28 | 1.67 | 1.12 | 0.6 | 0.5 |
| Radial surface direction (SRa) [μm] | 2.13 | 1.78 | 1.23 | 0.73 | 0.65 |
| Ratio $SRa_{ax}/SRa$ | 1.070 | 0.94 | 0.91 | 0.82 | 0.77 |
| Resistance at 500 V (ohm) | $4.1 \times 10^5$ | $3.8 \times 10^5$ | $4.2 \times 10^5$ | $1.0 \times 10^5$ | $1.5 \times 10^5$ |
| Hardness (shore A) | 62.3 | 62.0 | 63.1 | 62.5 | 62.8 |
| Bonding quality | Good | Good | Good | Good | Good |
| Print Quality | Good | Good | Bad uniformity | Bad uniformity | Bad uniformity |

*) = example not according to the disclosure

Accordingly, what has been shown are a conductive coating, a method for preparing a coating, a roller, and a method for manufacturing a roller and using a coating. While such coating, roller and methods have been described by means of specific embodiments and applications thereof, it is understood that numerous modifications and variations could be made thereto by those skilled in the art without departing from the spirit and scope of the present disclosure. It is therefore to be understood that within the scope of the claims, the disclosure may be practiced otherwise than as specifically described therein.

The invention claimed is:

1. A conductive coating suitable for coating a developer, charge or transfer roller in a developing apparatus to form a charge providing layer, said coating comprising
a conductive polymer in a matrix, said matrix comprising a methacrylic acid-acrylic ester copolymer and a polyurethane dispersion, wherein the methacrylic acid-acrylic ester copolymer and the polyurethane dispersion show micro phase separation.

2. The conductive coating according to claim 1, wherein the methacrylic acid-acrylic ester copolymer is a thickening agent.

3. The conductive coating according to claim 1, wherein the coating further comprises additives.

4. The conductive coating according to claim 3, wherein the additives are selected from the group consisting of one or more of a base, a levelling agent, a wetting agent, a surfactant, an antioxidant, a viscosity reducing agent, a thickening agent and a stabilizer.

5. A method for preparing the conductive coating according to claim 1, comprising the step of mixing an aqueous solution of a conductive polymer, an aqueous dispersion of an methacrylic acid-acrylic ester copolymer and an aqueous polyurethane dispersion.

6. A roller suitable for a developing apparatus comprising, from centre to periphery, a conductive mandrel, a conductive elastic base layer and a charge providing layer, wherein the charge providing layer is obtained by drying the conductive coating according to claim 1.

7. The roller according to claim 6, wherein the base layer is made of a rubber chosen from the group consisting of silicone rubber, ethylene-propylene-diene copolymer rubber (EPDM), urethane rubber, and nitrile-butadiene rubber (NBR).

8. The roller according to claim 6, wherein the charge providing layer has a surface roughness (SRa) of 0.1 μm<Sra<3 μm, measured according to ISO 4287:1997.

9. The roller according to claim 6, wherein the ratio between surface roughness of the charge providing layer in an axial direction ($SR_{ax}$) measured according to ISO 4287:1997 and surface roughness of the charge providing layer in a radial direction ($SR_{rad}$) measured according to ISO 4287:1997 of the roller is $0.5<SR_{ax}/SRr_{rad}<2$.

10. The roller according to claim 9, wherein the ratio between surface roughness of the charge providing layer in an axial direction ($SR_{ax}$) measured according to ISO 4287:1997 and surface roughness of the charge providing layer in a radial direction ($SR_{rad}$) measured according to ISO 4287:1997 of the roller is $0.75<Sra_{ax}/SRa_{rad}<1.25$.

11. The roller according to claim 10, wherein the ratio between surface roughness of the charge providing layer in an axial direction ($SR_{ax}$) measured according to ISO 4287:1997 and surface roughness of the charge providing layer in a radial direction ($SR_{rad}$) measured according to ISO 4287:1997 of the roller is $0.9 < SRa_{ax}/SRa_{rad} < 1.1$.

12. A method for manufacturing a roller comprising, from centre to the periphery, a conductive mandrel, a conductive elastic base layer and a charge providing layer, the method comprising the steps of
   applying the coating of claim 1 on the base layer and
   drying the coating of claim 1, to form the charge providing layer.

13. The method according to claim 12, wherein the coating is applied after roughening of the outer surface of the base layer.

14. The method according to claim 13, wherein the coating is applied by blasting.

15. The method according to claim 12, wherein the coating is dried at a temperature below 60° C., preferably at a temperature of 40° C. or below in order to control the surface roughness of the resulting charge providing layer.

16. The method according to claim 12, wherein the coating is applied by dipping, spraying or rolling.

17. A method of using the coating according to claim 1, the method comprising obtaining a micro phase separated charge providing layer on a roller in a developing apparatus.

18. The method according to claim 17 wherein the roller is a charge roller, developer roller or transfer roller, preferably a developer roller.

* * * * *